May 31, 1932.  C. O. WOOD  1,861,149

MOTOR CONTROL SYSTEM

Filed Sept. 12, 1929

Inventor
Claude O. Wood
Clarence F. Poole
Attorney

Patented May 31, 1932

1,861,149

UNITED STATES PATENT OFFICE

CLAUDE O. WOOD, OF CHICAGO, ILLINOIS, ASSIGNOR TO GOODMAN MANUFACTURING COMPANY, OF CHICAGO, ILLINOIS, A CORPORATION OF ILLINOIS

MOTOR CONTROL SYSTEM

Application filed September 12, 1929. Serial No. 392,208.

This invention relates to improvements in a system for the control of motors, and more particularly to an automatic control system for a motor having shunt field windings which motor is adapted for use in mines.

My invention has among other objects to provide an improved automatic circuit control means whereby the armature circuit is not connected with the source of current supply until the current in the shunt field has reached a certain predetermined normal value and is disconnected from the source of current supply when the current in said shunt field is reduced below said predetermined normal amount.

Mine motors are subjected to large fluctuations in voltage due to the fact that electrical underground equipment is intermittently in operation and the facts that the motors are usually located at a great distance from the source of current supply and the power lines from the source of current supply are usually of a more or less temporary nature. When the voltage impressed upon the shunt wound motor is below the normal voltage for which the motor is designed the tendency is for the current in the armature to rise above its normal value. This causes heating and burning of the armature and stalling of the motor. In the device of my invention, when current is turned on to the motor, the motor will not start until the current in the shunt field has reached a certain predetermined normal value, and when the voltage fluctuates so the current in the shunt field is below this predetermined normal value the armature is automatically disconnected from the source of current supply being automatically connected to said source of current supply when the current in the shunt field has again reached its predetermined normal value, thus providing a means to prevent heating and burning of the armature and stalling of the motor.

Other objects of my invention will appear from time to time as this specification proceeds.

Figure 1:
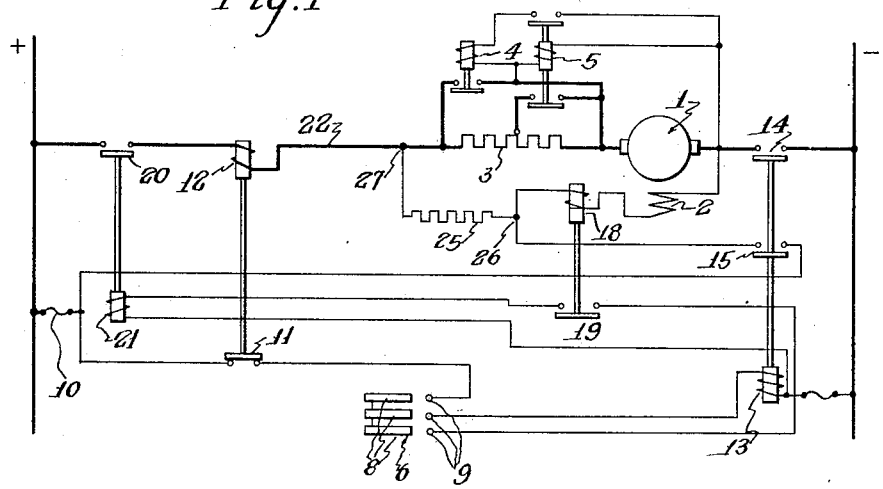
Figure 2:
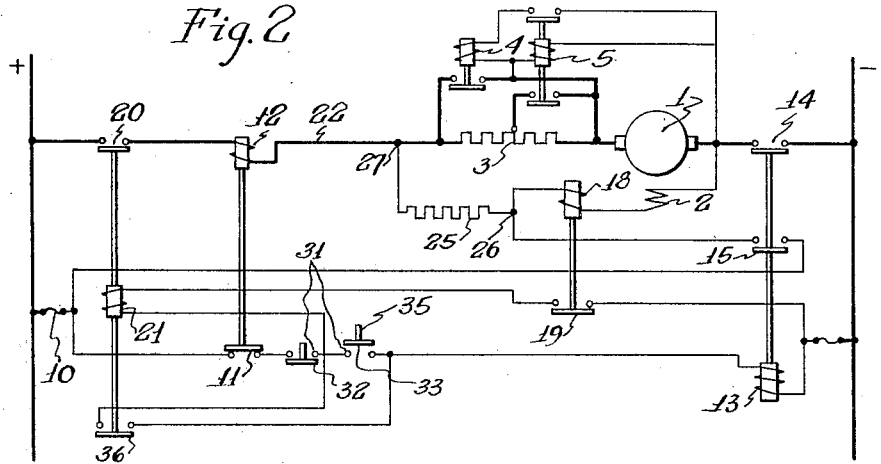

My invention may be more fully understood with reference to the accompanying drawings wherein:

Figure 1 shows a schematic wiring diagram illustrating a form of my invention; and Figure 2 is a schematic wiring diagram showing a modified form of my invention.

Like reference characters refer to like parts throughout the various figures.

In the drawings a motor armature is designated at 1 and a shunt field winding is designated at 2. A resistance 3 is provided in the armature circuit and is automatically cut out as the motor starts by means of automatically operated contactors generally indicated at 4 and 5 in a usual manner. These automatic contactors are of a usual construction and are well known in the art, so need not be described in detail. The automatic contactors 4 and 5 are so arranged in the armature circuit that they will cut out the resistance 3 from said armature circuit at predetermined time intervals in a usual manner when current in the shunt field has reached a predetermined normal value and the armature circuit has been automatically closed to start the motor.

In Figure 1 a starting switch 6 is provided which may be of any ordinary type but which herein comprises a drum type switch of an ordinary construction having contacts 8 thereon which may engage or disengage contacts 9 upon rotation of the drum to connect or disconnect the field circuit with the source of current supply. Thus when the contacts 8 engage the contacts 9 current flows from the positive source of current supply through a fuse 10, contacts 11 of an overload relay 12, through the starting switch 6 through a contactor operating coil 13 to the negative line to close an electrically operated contactor 14. An auxiliary contactor 15 is mechanically connected to the electrically operated contactor 14 to close as said contactor closes. Thus when the electrically operated contactor 14 is closed, the auxiliary contactor 15 is closed and current flows from the positive line through the auxiliary contactor 15 and through a coil 18 of a low voltage relay 19 in series with the shunt field 2. Current flows through the shunt field 2 to the negative line through the electrically operated contactor 14. An electrically operated contactor 20 is provided in the positive line in series with the armature 1 and has a contactor operating coil 21 connected in the circuit for closing said contactor. It may thus be seen that current cannot flow through the coil 21 to close the electrically operated contactor until the low voltage relay 19 is closed, and thus as long as the low voltage relay 19 is open current cannot flow through the positive line and armature 1.

When the current in the shunt field 2 has reached a predetermined normal value the low voltage relay coil 18 in series with the shunt field 2 is sufficiently energized to close the low voltage relay 19. This allows current to pass through the contactor operating coil 21 to energize said coil and close the electrically operated contactor 20, which closes the main line circuit and allows current to pass to the armature 1 through a conductor 22. Thus current passes through the resistance 3 and armature 1 to start the motor, said resistance being automatically cut out as the motor gains speed by means of the automatically operated contactors 4 and 5 in a usual manner hereinbefore mentioned.

When the current through the shunt field 2 is reduced below a predetermined normal value, the coil 18 of the low voltage relay 19 is deenergized sufficiently to allow the low voltage relay 19 to drop out. Thus the contactor operating coil 21 is deenergized and the contactor 20 is opened which disconnects the armature 1 from the main line circuit to stop the motor.

It may now be seen that when the starting switch 6 is left in an on position that the motor will start as soon as the current in the shunt field 2 reaches its predetermined normal value and that when motor is running, said motor will be disconnected from the main line when the current in the shunt field 2 is reduced below this predetermined normal value, automatically starting when the voltage again becomes normal. Thus a controlling circuit for a shunt wound motor has been provided whereby the motor is protected from low voltage at all times, said circuit being so arranged that the motor automatically starts when the voltage reaches its predetermined normal value. It may also be seen that since the armature circuit is open until the voltage in the shunt field has reached a predetermined normal value that the armature will have its developed torque at the instance the armature circuit closes.

Means are herein provided to prevent arcing of the contact points of the contactor 14 when the shunt field circuit is broken. This arcing is characteristic of a shunt wound motor when the shunt field circuit is broken and is caused by the self induced voltage of the shunt field 2 when the contactor 14 is opened either by opening of the starting switch 6 as is shown in Figure 1 or the low voltage relay 19 as is shown in Figure 2. This self induced voltage of a shunt field coil when suddenly opened may be many times its operating voltage and may burn the points of the contactor 14 or rupture the insulation on the shunt field unless protected in some manner or other. Said means for protecting said shunt field herein comprises a resistance 25 bridged from the field circuit at 26 to the armature circuit at 27 which resistance absorbs the self induced voltage of the shunt field 2 when the contactor 14 is opened and thus prevents arcing of the contact points of said contactor and prevents rupture of the insulation on the shunt field.

Resistances have formerly been placed in parallel with the shunt field coil of shunt wound motors to absorb the shunt field energy as the motor circuit is broken. When a resistance is so connected to the field circuit, current at full voltage is continually passing through said resistance. This necessitates the use of a large capacity resistance to prevent burning up of said resistance, and also impairs the efficiency of the motor. The resistance 25 is so hooked up to the motor circuit that current only passes through said resistance when the armature circuit is open which is a short time compared to the time when the armature circuit is closed since said resistance is connected from the positive side of the shunt field winding 2 to the positive side of the armature 1 the instant the armature circuit is closed, but as long as said armature circuit is open the side of the shunt field winding 2 which was its positive side when the armature circuit is closed becomes its negative side. Thus it may be seen that an efficient means has been provided to absorb the electrical energy discharged from the shunt field when the motor circuit is opened, which receives no energy when the motor is operating under normal conditions being energized only while the motor is starting or stopping and which may therefore be of a small capacity and thus will not impair the efficiency of the motor while running.

Referring now to the modified form of my invention shown in Figure 2, substantially the same connections are provided for the armature 1 and shunt field 2 as are shown in Figure 1 with the exception that a modified form of starting means is provided which makes it necessary to start the motor manually when the motor has automatically been shut off due to low voltage in the shunt field. Said modified starting means comprises a push button type of starting switch 30 which is substituted for the drum type starting switch 6. The push button type of starting switch 30 is of an ordinary construction so is not herein shown in detail and comprises fixed contacts 31 which may be engaged by movable contacts 32 and 33. The contact 32 is normally held in engagement with the fixed contacts 31 and is disengaged from said contacts by means of a push button 34. The contact 33 is normally disengaged from the fixed contacts 31 and is engaged with said contacts by means of a push button 35.

In starting the motor, manual pressure is exerted on the push button 35 to engage the contact 33 with the contacts 31 until the voltage in the shunt field 2 has been built up to a predetermined normal value and the low voltage relay 19 and electrically operated contactor 20 have closed when pressure is released from the push button 35. Means are provided to keep the motor in operation when pressure is released from the push button 35 which herein comprises a mechanically operated contactor 36 connected to the electrically operated contactor 20 so said mechanical contactor closes as the electrically operated contactor 20 closes. This closes the circuit opened upon release of the push button 35, and keeps said circuit closed until the main line circuit is broken either by opening of the contactor 20 caused by low voltage in the shunt field or pressure on the push button 34 which disconnects the contact 32 from the contacts 31.

It may therefore be seen that when the main line circuit is opened for any reason whatsoever said main line circuit cannot be closed except by pressure on the push button 35, and that the main line circuit may be broken either by low voltage in the shunt field 2 or pressure on the push button 34. Thus an automatic motor circuit has been provided whereby the motor is stopped by low voltage in the shunt field and may only be started when the voltage has reached a predetermined normal value by applying pressure to the push button 35 until the shunt field voltage has reached its predetermined normal value, thus making it impossible to start the motor when the motor voltage is below normal or without the aid of manual pressure on the push button 35 thus insuring that the motor will not be started when a dangerous condition to said motor or machinery driven by said motor is present.

While I have shown herein and described one form of my invention, I do not wish to be limited to the precise details of construction or arrangements of parts herein shown and described, except as specifically limited in the appended claims.

I claim as my invention:

1. In a motor control system, the combination of a source of power, a motor having an armature and a shunt field winding, a main line circuit leading from said source of power to said armature including a positive and negative conductor, a control switch for connecting said shunt field winding to the source of current supply, a low voltage relay having an operating coil connected in series with said shunt field winding, automatic operable means connected with said relay and actuated by said relay for connecting said armature to said source of power when the current in said shunt field winding has reached a certain predetermined normal value, and disconnecting said armature from the source of power supply when the current in said shunt field winding has been reduced below said predetermined normal value, and means for absorbing the electrical energy of said shunt field as said armature is disconnected from the source of power comprising an electrical current absorption means connected from said shunt field winding to the positive conductor of said main line circuit leading to said armature.

2. In a motor control system, the combination of a source of power, a motor having an armature and a shunt field winding, a main line circuit leading from said source of power to said armature including a positive and negative conductor, a control switch for connecting said shunt field winding to the source of current supply, a low voltage relay having an operating coil connected in series with said shunt field winding, automatic operable means connected with said relay and actuated by said relay for connecting said armature to said source of power when the current in said shunt field winding has reached a certain predetermined normal value, and disconnecting said armature from the source of power supply when the current in said shunt field winding has been reduced below said predetermined normal value, and means for absorbing the electrical energy of said shunt field as said armature is disconnected from the source of power comprising an electrical resistance connected from said shunt field winding to the positive conductor of said main line circuit leading to said armature.

3. In a motor control system, the combination of a source of power, a motor having an armature and a shunt field winding, a main line circuit leading from said source of power to said armature including a positive and negative conductor, an auxiliary circuit, a line contactor connected in said negative conductor, an auxiliary contactor in said auxiliary circuit mechanically connected to said line contactor and operable therewith for connecting said shunt field winding to the source of current supply, a line contactor connected in said positive conductor for connecting said armature to the source of current supply, a control switch for energizing and closing said first named contactors, a low voltage relay having an operating coil connected in series with said shunt field for energizing said second named contactor and connecting said armature with said source of power when the current in said shunt field winding has reached a certain predetermined normal value or disconnecting said armature from said source of power when the current in said shunt field winding has been reduced below its predetermined normal value and means for absorbing the electrical energy of said shunt field as said armature is disconnected from the source of power comprising an electrical current absorption means connected from said shunt field winding to the positive conductor of said main line circuit.

4. In a motor control system, the combination of a source of power, a motor having an armature and a shunt field winding, a main line circuit leading from said source of power to said armature including a positive and negative conductor, an auxiliary circuit, a line contactor connected in said negative conductor, an auxiliary contactor in said auxiliary circuit mechanically connected to said line contactor and operable therewith for connecting said shunt field winding to the source of current supply, a line contactor connected in said positive conductor for connecting said armature to the source of current supply, a control switch for energizing and closing said first named contactors, a low voltage relay having an operating coil connected in series with said shunt field for energizing said second named contactor and connecting said armature with said source of power when the current in said shunt field has reached a certain predetermined normal value or disconnecting said armature from said source of power when the current in said shunt field winding has been reduced below its predetermined normal value and means for absorbing the electrical energy of said shunt field as said armature is disconnected from the source of power comprising an electric resistance connected from said shunt field winding to the positive conductor of said main line circuit.

5. In a motor control system, the combination of a source of power, a motor having an armature and a shunt field winding, a main line circuit leading from said source of power to said armature including a positive and negative conductor, an auxiliary circuit, a line contactor connected in said negative conductor, an auxiliary contactor in said auxiliary circuit mechanically connected to said line contactor and operable therewith for connecting said shunt field winding to the source of current supply, a line contactor connected in said positive conductor for connecting said armature to the source of current supply, a control switch for energizing and closing said first named contactors, a low voltage relay having an operating coil connected in series with said shunt field for energizing said second named contactor and connecting said armature with said source of power when the current in said shunt field winding has reached a certain predetermined normal value or disconnecting said armature from said source of power when the current in said shunt field winding has been reduced below its predetermined normal value and means for absorbing the electrical energy of said shunt field as said armature is disconnected from the source of power comprising an electrical absorption means connected from said shunt field winding beyond said operating coil for said relay to the positive conductor of said main line circuit leading to said armature.

Signed at Chicago, in the county of Cook and State of Illinois, this 10th day of September, A. D. 1929.

CLAUDE O. WOOD.